United States Patent [19]

Galli et al.

[11] Patent Number: 5,652,281
[45] Date of Patent: Jul. 29, 1997

[54] GRAFT COPOLYMERS OF POLYOLEFINS AND A METHOD OF PRODUCING SAME

[75] Inventors: Paolo Galli, Wilmington; Anthony J. DeNicola, Jr., Newark, both of Del.; Jeanine A. Smith, West Chester, Pa.

[73] Assignee: Montell North America Inc., Wilmington, Del.

[21] Appl. No.: 342,971

[22] Filed: Nov. 21, 1994

Related U.S. Application Data

[62] Division of Ser. No. 973,193, Nov. 6, 1992, Pat. No. 5,411,994, which is a continuation of Ser. No. 604,553, Oct. 26, 1990, abandoned, which is a continuation-in-part of Ser. No. 454,228, Dec. 21, 1989, abandoned.

[51] Int. Cl.$^6$ .................. C08F 255/02; C08F 255/04; C08F 255/08; C08F 255/10

[52] U.S. Cl. .................. 522/114; 522/116; 522/120; 522/125; 522/157; 522/161; 522/158; 522/159; 522/160

[58] Field of Search .................. 522/114, 116, 522/120, 125, 157, 161, 158, 159, 160

[56] References Cited

U.S. PATENT DOCUMENTS

| | | | |
|---|---|---|---|
| 2,948,666 | 11/1960 | Lawton | 522/157 |
| 3,058,950 | 10/1962 | Stanton et al. | 522/116 |
| 3,188,165 | 6/1965 | Magat et al. | 8/115.9 |
| 3,201,336 | 8/1965 | Magat et al. | 522/161 |
| 3,314,904 | 4/1967 | Burkus | 260/4 |
| 3,322,661 | 5/1967 | Yoshikawa et al. | 522/125 |
| 3,616,365 | 10/1971 | Stastny et al. | 521/50.5 |
| 3,714,083 | 1/1973 | Nakayama et al. | 521/50.5 |
| 3,904,709 | 9/1975 | Morimoto et al. | 525/322 |
| 4,303,757 | 12/1981 | Kajimura et al. | 525/322 |
| 4,377,010 | 3/1983 | Fydelor et al. | 522/120 |
| 4,839,423 | 6/1989 | Moriya et al. | 525/322 |
| 4,897,433 | 1/1990 | Sugi et al. | 522/116 |
| 5,140,074 | 8/1992 | DeNicola, Jr. et al. | 525/263 |

FOREIGN PATENT DOCUMENTS

| | | |
|---|---|---|
| 0135499 | 5/1979 | Germany . |
| 3090523 | 4/1988 | Japan . |
| 0929148 | 5/1982 | U.S.S.R. . |

Primary Examiner—Susan W. Berman

[57] ABSTRACT

Disclosed are graft copolymers of polyolefins and a method of preparing the graft copolymers. The method includes irradiating a mass of olefin polymer particles and thereafter treating the mass of particles with a vinyl monomer in liquid form. A nonoxidizing environment is maintained throughout the process while free radicals produced in the olefin polymer by the irradiation are present, thereby preventing degradation of the polymer. In a final step, residual free radicals are deactivated, and any unreacted monomer is removed.

11 Claims, 1 Drawing Sheet

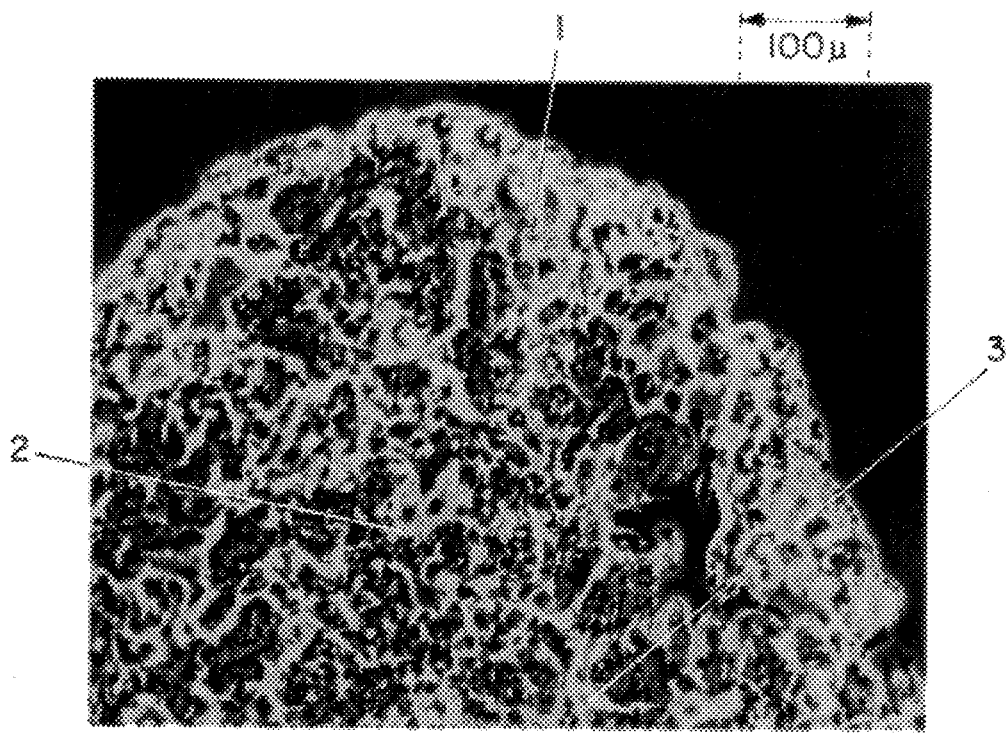
FIG. 1    X125
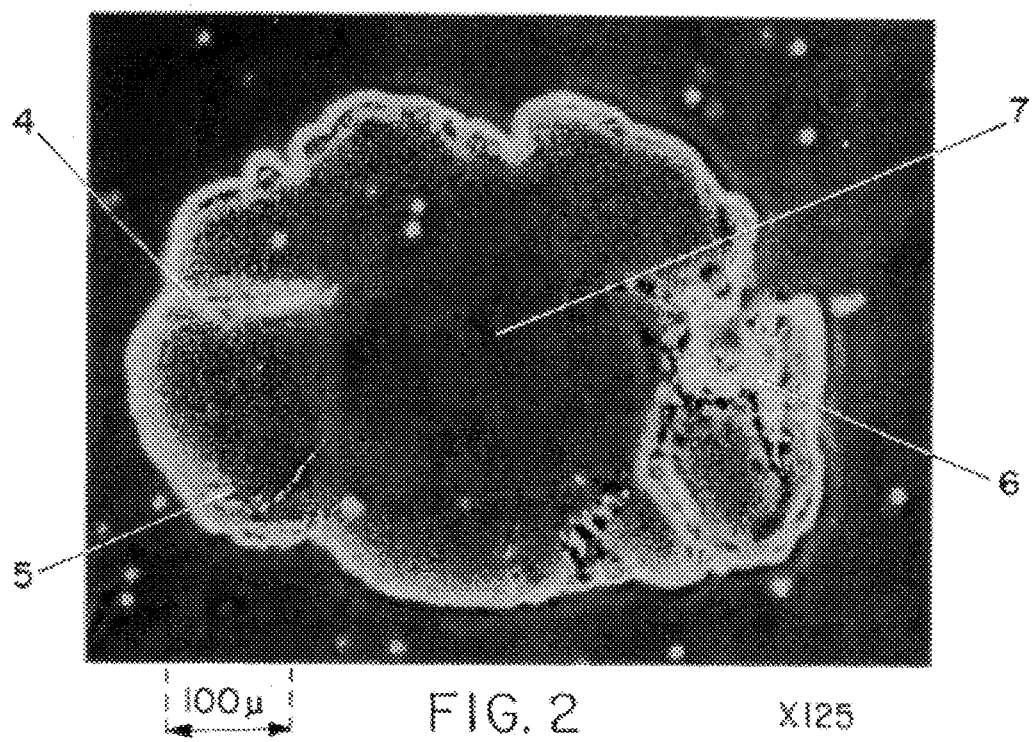
FIG. 2    X125

GRAFT COPOLYMERS OF POLYOLEFINS AND A METHOD OF PRODUCING SAME

This application is a division of U.S. patent application Ser. No. 07/973,193, filed Nov. 6, 1992, now U.S. Pat. No. 5,411,994, which is a continuation of U.S. patent application Ser. No. 07/604,553 filed Oct. 26, 1990 and now abandoned, which is a continuation-in-part of U.S. patent application Ser. No. 07/454,228, filed Dec. 21, 1989, now abandoned.

FIELD OF THE INVENTION

This invention relates to grafted olefin polymers produced by free radical initiated graft polymerization. The present invention also relates to a method of making graft copolymers of polyolefins, and, more particularly, a method of graft polymerizing monomers at free-radical sites produced on olefin polymers by high-energy ionizing radiation.

BACKGROUND OF THE INVENTION

Graft copolymers of polypropylene have been of interest for some time because they are capable of possessing some properties of the grafted polymer, produced by the homo or copolymerization of the monomer or monomers, respectively, as well as of the polypropylene backbone. Some of these graft copolymers are useful as compatibilizers in the preparation of normally incompatible polymer blends or alloys.

Polypropylene graft copolymers generally have been made by forming active sites on polypropylene by irradiation with high-energy ionizing radiation either in the presence of a monomer capable of grafting to the active sites, or followed by treatment with the monomer. The free radicals produced in the propylene polymer as a result of the irradiation act as initiators for the polymerization of the monomer, as well as active sites for grafting.

Much of the prior art related to the radiation grafting of polymerizable monomers onto polypropylene describes applying the process to already shaped, i.e., prefabricated, polypropylene articles, such as films, filaments, woven fabrics and the like. While occasional reference has been made heretofore to the use of polypropylene in powder or granulate form as the substrate for the graft copolymerization, attention has not been centered on possible effects that the grafting process conditions may have on those properties of the resulting graft copolymer which are important in determining its processibility. For example, some of the conditions disclosed in the prior art lead to drastic reductions in the length of the polypropylene backbone, while others lead to crosslinking. Such occurrences often are unacceptable, for example when the graft copolymer is in the form of particulate material which has to undergo melt-processing to be formed into articles of various types.

U.S. Pat. No. 3,058,950, relating to the preparation of dye-receptive graft copolymers of N-vinyl-3-morpholinone on polyolefin substrates, by the use of high-energy radiation, states that it is generally desirable, and of significant advantage, to employ the polyolefin as a pre-formed, fabricated article. This reference also states that unfabricated graft copolymers made by the described process may be converted to shaped articles by any desired technique adapted for such purpose with conventional polymers. Grafting process features described as advantageous include diluting the monomer in a solvent or dispersant, immersing the polyolefin polymer substrate in the monomer solution or dispersion bath, and subjecting the monomer-impregnated polyolefin substrate to a field of high-energy radiation. These teachings are indicative of a failure to recognize that one or more of the conditions disclosed as being utilizable, and even advantageous, in the graft copolymerization process may have a deleterious effect on the processibility and/or utility of the graft copolymer.

According to U.S. Pat. No. 3,714,083, polypropylene powder is irradiated in air at a temperature below 5° C., preferably within the range of −20° to −40° C., and then placed in a dilute solution of divinylbenzene monomer in a solvent such as methanol. Higher irradiation temperatures are said to cause a predominance of homopolymer formation, and irradiation at above 5 Mrad is stated to be undesirable because of excessive breakage and degradation of polypropylene that is said to occur even at temperatures as low as 5° C. or less.

The effect of oxygen in one stage or another of the radiation initiated grafting process is variously described in the prior art. For example, in the process described in U.S. Pat. No. 3,201,336, polypropylene, preferably in the form of a semi-finished or finished article, is subjected to high-energy ionizing radiation in the presence of oxygen, and thereafter the irradiated polymer is contacted with different monomers in successive stages to produce different graft branches on the polypropylene trunk. The presence of oxygen is said to be required to form active centers at which the grafting will take place. Oxygen, said to be a polymerization inhibitor, preferably is absent during the contacting of the monomer with the polymer.

In U.S. Pat. No. 3,188,165, the use of an atmosphere of inert gas, or an air- and water-impervious wrap, around a monomer-treated shaped substrate during irradiation to avoid the degradation which may occasionally be observed when the irradiation is conducted in the presence of air or moisture is disclosed.

U.S. Pat. No. 3,314,904 describes blending (a) a graft copolymer of styrene, or styrene and acrylonitrile, on polyethylene or polypropylene and (b) a compatible rubber to produce a "gum plastic". The graft copolymer is made by first "activating" the polyolefin by subjecting it to high-energy ionizing radiation, and then contacting the irradiated polymer with the monomer and subjecting the mixture to polymerizing conditions. Linear polypropylene of large surface area per unit weight is recommended as a substrate. Pro-fax 6501 propylene homopolymer is specified as typical. To maintain graftability, the irradiated polypropylene is kept cold and in an inert atmosphere until it is charged into the grafting reactor. To maximize the styrene or styrene/acrylonitrile content (75–95% by weight) in the graft copolymer, the irradiated polypropylene is stirred with a dilute solution of the monomer(s) at elevated temperatures for long periods of time. The monomer conversion, i.e., the amount of monomer consumed to form the graft copolymer, is low.

East German Patent 135,499 describes a radiation grafting process. It involves bringing one or more normally liquid monomers in the vapor phase, on a carrier gas, into contact with a polyolefin powder or granulate, and subsequently removing unreacted monomer from the reaction zone with the carrier gas. The monomer vapor can be introduced after completion of the irradiation or before the irradiation commences, or the irradiation and introduction of monomer vapor can begin together. Also, additional monomer vapor can be introduced after completion of the irradiation. The product made from polypropylene and styrene and acrylonitrile vapors by this process was a mixture of polypropylene and a graft copolymer of propylene and styrene/acrylonitrile, the grafting having taken place on the external surface of the polypropylene granulate.

A process is needed for performing the radiation grafting of polymerizable monomers onto olefin polymers in raw, as-polymerized, or unprocessed form, i.e., onto virgin polymer, which minimizes degradation or visbreaking and does not lead to crosslinking of the polymer substrate. Degradation has a deleterious effect on the molecular weight of the polymer, and crosslinking adversely affects or destroys the melt processability of the polymer. In other words, the process should produce a polyolefin graft copolymer wherein the molecular weight of the olefin polymer backbone and melt processability of the graft copolymer are comparable to those of the olefin polymer starting material used to form it. In addition, the process should not result in a graft copolymer having a melt flow rate which increases on storage due to the presence of residual free radicals. Further, a graft polymerization process is needed which is relatively easy to practice, which utilizes the grafting monomer in an efficient manner so that the formation of homopolymer of the grafting monomer at the expense of the formation of the poly(monomer) grafted olefin copolymer is minimized, and which is more economical than current processes.

There is also a need for graft copolymers of polyolefins in the form of particles having a uniform distribution of graft polymerized monomer throughout the particle. Graft copolymers having uniform distribution are advantageous in that they afford grafted olefin polymer products whose properties are unaffected by the presence of relatively large volumes of essentially unreacted olefin polymer in the grafted olefin polymer particles, which happens in conventional graft polymerization processes since the monomer essentially grafts to the surface of the polymer particle thereby producing a shell of grafted polymer around an essentially ungrafted olefin polymer core.

SUMMARY OF THE INVENTION

This invention provides a uniformly grafted particulate olefin polymer material formed by the free radical-initiated grafting and polymerization of at least one vinyl monomer at free radical sites on an as-polymerized particulate olefin polymer material having (a) a pore volume fraction of at least about 0.07 wherein more than 40% of the pores have a diameter larger than 1 micron; (b) a surface area of at least 0.1 m²/g; and (c) a weight average diameter in the range of about from 0.4 to 7 mm. The amount of polymerized vinyl monomer(s) grafted to the as-polymerized particulate olefin polymer material is about from 10% to 70%, preferably about from 10% to 50%, of the total weight of the grafted olefin polymer product, and the graft polymer is well and uniformly distributed throughout the particles of the grafted olefin polymer material.

In another embodiment, the present invention provides a method of making a graft copolymer of an olefin polymer comprising the steps of:

(a) irradiating a particulate olefin polymer material at a temperature in the range of about from 10° to 85° C. with high-energy ionizing radiation to produce free-radical sites in the olefin polymer material;

(b) treating the irradiated particulate olefin polymer material at a temperature up to about 100° C. for a period of at least about 3 minutes, with about from 5 to 80 percent by weight, based on the total weight of olefin polymer and grafting monomer used, of at least one grafting monomer which is capable of being polymerized by free radicals;

(c) simultaneously or successively in optional order, (1) deactivating substantially all residual free radicals in the resultant grafted particulate olefin polymer material, and (2) removing any unreacted vinyl monomer from said material;

the particulate olefin polymer material being maintained in a substantially non-oxidizing environment throughout said steps at least until after the deactivation of residual free radicals has been completed.

BRIEF DESCRIPTION OF THE DRAWINGS

The grafted olefin polymer product of this invention is illustrated by reference to the accompanying drawings in which:

FIG. 1 is a 125X phase-contrasted microtomed photomicrograph of a cross-section of a particle of the uniformly grafted as-polymerized propylene homopolymer product of Example 8 having light areas, exemplified by 1, 2 and 3, which are rich in polystyrene grafted propylene homopolymer material throughout the particle; and FIG. 2 is a 125X phase-contrasted microtomed photomicrograph of a cross-section of a particle of the grafted conventional propylene homopolymer product of Example 38 having light areas, exemplified by 4, 5 and 6, which are rich in polystyrene grafted propylene homopolymer material essentially around the perimeter of the core of the particle thereby forming a shell around the propylene polymer core of the particle. The dark areas, exemplified by 7, are essentially ungrafted propylene homopolymer.

DETAILED DESCRIPTION

All parts and percentages used in this specification are by weight unless otherwise noted.

The olefin polymer material useful in the practice of the method of this invention for making graft copolymers of olefin polymers is (a) a homopolymer of a linear or branched $C_2$–$C_8$ 1-olefin; (b) a random copolymer of a linear or branched $C_2$–$C_8$ 1-olefin with a different olefin selected from the group consisting of $C_2$–$C_{10}$ 1-olefins, provided that, when the different olefin is ethylene, the maximum polymerized ethylene content is about 10%, preferably about 4%, when the olefin is propylene and the different olefin is a $C_4$–$C_{10}$ 1-olefin, the maximum polymerized content thereof is about 20%, preferably about 16%, and when the olefin is ethylene and the different olefin is a $C_3$–$C_{10}$ 1-olefin, the maximum polymerized content thereof is about 10%, preferably about 5%; (c) a terpolymer of a linear or branched $C_3$–$C_8$ 1-olefin and two different olefins selected from the group consisting of ethylene and $C_4$–$C_8$ 1-olefins, provided that, when ethylene is one of the different olefins, the maximum polymerized ethylene content is about 5%, preferably about 4%, and when the olefin is a $C_4$–$C_8$ 1-olefin, the maximum polymerized content of the different $C_4$–$C_8$ 1-olefin is about 20%, preferably about 16%; or (d) a homopolymer of (a) or random copolymer of (b) impact-modified with from about 10 to about 60% of (i) an ethylene-propylene rubber having an ethylene content of about 7 to about 70%, preferably from about 10 to about 40%, most preferably ethylene-propylene rubber having an ethylene content of from about 7 to about 40%, (ii) an ethylene/butene-1 copolymer rubber (EBR) having an ethylene content of from 30 to 70%, (iii) a propylene/butene-1 copolymer rubber (PBR) having a butene-1 content of from 30 to 70%, (iv) an ethylene/propylene/non-conjugated diene monomer rubber (EPDM) having an ethylene content of 30 to 70% and diene content of from 1 to 10%, (v) an ethylene/propylene/butene terpolymer rubber (EPBR) having a propylene content of from 1 to 10% and butene content of from 30 to 70% or a propylene content of from 30 to 70% and butene content of from 1 to 10%.

The $C_{2-8}$ 1-olefins which can be used in the preparation of the above olefin polymer materials include ethylene, propylene, 1-butene, isobutylene, 3-methyl-1-butene, 3,4-dimethyl-1-butene, 1-pentene, 4-methyl-1-pentene, 1-hexene, 3-methyl-1-hexene, 1-heptene and the like.

$C_3$–$C_{10}$ 1-olefins which can be used to prepare olefin polymer materials as described above include linear and branched olefins such as those listed above for the $C_2$–$C_8$ 1-olefins which have at least 3 carbon atoms.

When the olefin polymer is an ethylene homopolymer it has a density of 0.91 g/cm$^3$ or greater, and when the olefin polymer is an ethylene copolymer with a $C_{3-10}$ alpha-olefin it has a density of 0.91 g/cm$^3$ or greater. Suitable ethylene copolymers include ethylene/butene-1, ethylene/hexene-1 and ethylene/4-methyl-1-pentene. The ethylene copolymer can be a HDPE or a LLDPE, and the ethylene homopolymer can be a HDPE or a LDPE. Typically the LLDPE and LDPE have densities of 0.91 g/cm$^3$ or greater and the HDPE have densities of 0.95 g/cm$^3$ or greater.

The impact-modified olefin polymer can be prepared by first polymerizing a $C_2$–$C_8$ 1-olefin to form a homopolymer of said olefin, or copolymerizing such an olefin with a different olefin selected from $C_{4-10}$ 1-olefins, and then polymerizing the relevant monomers in the presence of said homopolymer in a reactor or series of reactors. Mechanical blends of the relevant polymers which have been prepared separately can also be used in the practice of the method of this invention.

Homopolymers and random copolymers of ethylene, propylene and 1-butene are preferred. With respect to ethylene, HDPE and LLDPE are preferred.

Suitable particulate forms of the olefin polymer material used in the present method include powder, flake, granulate, spherical, cubic and the like. Spherical particulate forms having a pore volume fraction of at least about 0.07 are preferred in the present method and are essential for the preparation of the grafted particulate olefin product of this invention.

According to the method of this invention, free radical or active sites are formed on the particulate olefin polymer material by irradiation before the polymer is exposed to the vinyl monomer(s). Irradiation in the absence of monomer is advantageous although the degree of benefit varies from monomer to monomer. In the case of styrene, irradiation in the absence of monomer favors a higher monomer conversion and a smaller solvent-extractable fraction, indicative of less homopolymerization of the styrene monomer.

The olefin polymer material is irradiated with high-energy ionizing radiation at a dose rate in the range of about from 1 to 1×10$^4$ megarads per minute for a period of time sufficient for the formation of free radical intermediates to occur, but insufficient to cause gelation of the polymer. The ionizing radiation used to form the active sites on the olefin polymer material should have sufficient energy to penetrate the mass of olefin polymer material being irradiated. The energy must be sufficient to ionize the molecular structure and to excite atomic structure, but not sufficient to affect atomic nuclei. The ionizing radiation can be of any kind, but the most practical kinds comprise electrons and gamma rays. Preferred are electrons beamed from an electron generator having an accelerating potential of 500–4,000 kilovolts.

Satisfactory results in terms of graft level are achieved with an ionizing radiation dose of about 1–12 megarads, preferably at least about 2 megarads, delivered generally at a dose rate of about 2–5000 megarads per minute. Higher doses within the operable ranges are associated with a higher graft level and efficiency, at a given monomer addition level.

The term "rad" is usually defined as that quantity of ionizing radiation that results in the absorption of 100 ergs of energy per gram of irradiated material, regardless of the source of radiation. In the usual practice of the method described herein, energy absorption from ionizing radiation is measured by the well-known conventional dosimeter, a measuring device in which a strip of fabric containing a radiation sensitive dye is the energy-absorption sensing means. Hence, as used herein, the term "rad" means that quantity of ionizing radiation resulting in the absorption of the equivalent of 100 ergs of energy per gram of the fabric of a dosimeter placed at the surface of the particulate olefin polymer material being irradiated in the form of a bed or layer of particulate material.

The irradiated particles of olefin polymer material, while being maintained in a substantially non-oxidizing atmosphere (see below), are treated with at least one vinyl monomer as a liquid or in solution, optionally diluted with a suitable diluent, preferably by adding the liquid monomer or monomer solution to, and/or dispensing it onto, the particulate material at a controlled rate, while the material is agitated or conveyed by any suitable conveying means, and most preferably by releasing a fine mist or spray of at least one monomer onto the irradiated particulate material while the particles are in motion, either relative to each other or to the point(s) from which the monomer is released or dispensed. Introducing monomer in this manner facilitates the dispersion thereof, good dispersion being helpful because of the speed of the grafting reaction. Preferably, the particulate material is agitated by using a fluidized bed or a mechanically agitated bed, or conveyed by moving the material by means of a conveyor belt. The objective is to add about from 5 to 80 percent by weight of vinyl monomer (based on the total weight of the olefin polymer material and vinyl monomer) to the polymer material at a controlled rate so as to avoid particle agglomeration.

Control of the monomer addition rate and polymer material agitation are especially important for good dispersion when the volume of liquid to be added is relatively small, and for heat control and maintenance of free-flowing particles when the volume of liquid to be added is large. In certain aspects, the most preferred method for contacting the irradiated olefin polymer material with monomer may be characterized as a "dry" technique inasmuch as essentially dry particulate olefin polymer material is exposed to a fine mist of monomer at a rate such that the monomer is gradually absorbed by the particulate material.

The vinyl monomer, if liquid at room temperature, can be used neat or in combination with a solvent or diluent which is inert with respect to the particulate polymer material and is not polymerizable by free radicals. If a solid at room temperature, the vinyl monomer can be used in solution in a solvent which is inert as set forth above. Mixtures of neat monomer, diluted monomer, and/or dissolved monomer can be used, particularly when two or more monomers are used. In all cases, whether or not a solvent or diluent is present, the range given above (i.e., about from 5 to 80 percent) for the amount of vinyl monomer used to treat the particulate olefin Polymer material is based on the monomer content.

When a diluent for the monomer is used, less than about 70%, preferably no more than about 50%, and most preferably no more than about 25% by weight, based on the weight of the monomer and the diluent, is used to avoid excessive drops in monomer conversion. Use of solvent in excess of the amount required to dissolve the monomer should be avoided for the same reason.

Solvents and diluents useful in the practice of the method of this invention are those compounds which are inert as described above and which have a chain-transfer constant of less than about $1 \times 10^{-3}$. Suitable solvents and diluents include ketones, such as acetone; alcohols, such as methanol; aromatic hydrocarbons, such as benzene and xylene; and cycloaliphatic hydrocarbons, such as cyclohexane.

In the method of the invention the irradiated particulate olefin polymer material is maintained in a substantially non-oxidizing atmosphere, e.g., under inert gas, during such time that free radicals are present therein. The olefin polymer material is also maintained in such an atmosphere during the formation of the free radicals. The reason for this is that upon exposure to an oxidizing atmosphere, such as air, the free radicals are converted to peroxy radicals, which visbreak or degrade the polymer material thereby causing substantial reductions in molecular weight with concomitant increases in melt flow rate. Moreover, with some monomers, e.g., styrene and butyl methacrylate, the presence of large amounts of air during the treatment of the irradiated polymer interferes with the graft polymerization per se. Therefore, the irradiation of the polymer is carried out in a substantially non-oxidizing atmosphere, as is the subsequent treatment of the irradiated particles with the vinyl monomer(s).

Likewise, the residual free radicals present in the olefin polymer material after the treatment with the monomer is completed have to be deactivated, preferably by heating of the particles, before the particles are exposed to air or other oxidizing gas. Otherwise, the product will lack storage stability, i.e. degradation of the grafted polymer product will occur over time. Consequently, until the free radicals have been deactivated, exposure of the grafted particles to an oxidizing environment in the reactors as well as in any connecting transfer lines is avoided.

On the other hand, while it is necessary to deactivate residual free radicals, it is necessary to avoid deactivation before grafting has occurred, inasmuch as the free radicals are needed to act as initiation sites for the polymerization of the vinyl monomer. Since, as deactivation of the free radicals occurs on heating, e.g., at temperatures of about 110° C. and above, the temperature must be carefully controlled in the graft polymerization process so as to be able to take advantage of the higher degree of reactivity between the irradiated olefin polymer material and the monomer which may be encountered at elevated temperatures while, at the same time, suppressing the tendency toward radical deactivation.

In many cases the graft polymerization reaction is completed in about 30–60 minutes if conducted at room temperature. A rise in the temperature of the polymer, e.g., up to about 80° C., owing to a reaction exotherm may occur in some cases. There is no advantage to using temperatures much below ambient in the irradiation step, and consequently temperatures of about from 10° C. to 85° C. are preferred in that step. A temperature of about from 10° C. to 100° C. also can be used in the graft polymerization step, but a temperature of about from 10° C. to 70° C. is preferred, with a temperature of about from 10° C. to 50° C. being most preferred.

The maximum temperature to which the particulate olefin polymer material is exposed during the irradiation and graft polymerization steps will depend also on the melting point of the polymer material. Melting should be avoided, and the temperature of the polymer material in these steps preferably will be well below, e.g., at least about 20° C. below, the polymer's melting point. In the case of 1-butene polymers, for example, the irradiation and graft polymerization temperatures preferably should not exceed about 85° C.

For best utilization of the free radicals generated in the irradiation step, and also for practical reasons, the irradiated polymer, preferably, will be delivered directly to the graft polymerization reactor from the radiation chamber. However, a hold-up time at room temperature of about from 2 to 30 minutes, or even as long as about two hours, between the irradiation and graft polymerization steps is not precluded. However, to avoid extensive radical decay, no more than about two hours (at room temperature) should be allowed to elapse before the irradiated polymer enters the graft polymerization reactor. Typically the hold-up time is from about 2 to about 10 minutes.

The expression "substantially non-oxidizing", when used herein to describe the environment or atmosphere to which the irradiated olefin polymer material is exposed before the deactivation of residual free radicals, means an environment in which the active-oxygen concentration, i.e., the concentration of oxygen in a form that will react with the free radicals in the irradiated material, is less than about 15%, preferably less than about 5%, end more preferably less than about 1%, by volume. The most preferred concentration of active oxygen is 0.004% or lower by volume. Within these limits, the non-oxidizing atmosphere can be any gas, or mixture of gases, which is oxidatively inert toward the free radicals in the olefin polymer material, e.g., nitrogen, argon, helium, and carbon dioxide.

The vinyl monomers useful in accordance with this invention may be any monomeric vinyl compound capable of being polymerized by free radicals wherein the vinyl radical, $H_2C=CR-$, wherein R is H or methyl, is attached to a straight or branched aliphatic chain or to a substituted or unsubstituted aromatic, heterocyclic, or alicyclic ring in a mono- or polycyclic compound. Typical substituent groups may be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole and homologs thereof, e.g., alpha-methylstyrene, para-methylstyrene, methylchlorostyrene, methylvinylpyridine, and ethylvinylpyridine; (2) vinyl esters of aromatic and saturated aliphatic carboxylic acids, including vinyl formate, vinyl acetate, allyl acetate, vinyl chloracetate, vinyl cyanoacetate, vinyl propionate, and vinyl benzoate; and (3) unsaturated aliphatic nitriles and carboxylic acids and their derivatives, including acrylonitrile, methacrylonitrile, acrylamide, methacrylamide, acrylic acid, acrylate esters, such as the methyl, ethyl, hydroxyethyl, and butyl acrylate esters, methacrylic acid, ethacrylic acid, and methacrylate esters, such as the methyl, ethyl, butyl, benzyl, phenylethyl, phenoxyethyl, and hydroxypropyl methacrylate esters, and maleic anhydride. Free-radical-polymerizable divinyl compounds, such as butadiene and isoprene, which lack an inherent tendency to crosslink under free radical polymerization conditions also can be used. Multiple monomers from the same or different classes may be employed.

Of the various vinyl monomers that can be used, styrene, acrylonitrile, methyl methacrylate and butyl acrylate are preferred. Two or more monomers may be grafted simultaneously onto the olefin polymer material by the present process, to produce different homopolymer grafts or copolymer grafts or both on the olefin polymer backbone depending on the relative reactivity of the monomers employed. Alpha-methylstyrene and maleic anhydride will graft, but do not homopolymerize. Hence they must be used in combination with another vinyl compound with which they copolymerize and which has a greater tendency for free radical-initiated polymerization, such as styrene.

The graft level achieved in the present method is dependent on several factors including the radiation dose used in the irradiation step (which determines the number of free radical sites produced), the amount of monomer used to treat the irradiated olefin polymer material, and the time and temperature at which the monomer treatment is conducted. Other factors, e.g., the olefin polymer particle size and porosity, the monomer used and the rate at which it is contacted with the polymer, also affect the graft level, some affecting whether graft polymerization takes place on the surface or uniformly throughout the polymer particle, others chain length and extent of homopolymer formation. Accordingly, the selection of these variables will be made with a view to affording a desired graft level. Levels of up to about 50% polymerized vinyl monomer in the graft copolymer, based on the weight of grafted olefin polymer product are preferred. A higher radiation dose favors a higher graft level and graft efficiency at a given grafting reaction temperature and monomer addition level; and a higher monomer addition level favors a higher graft level under otherwise the same conditions of dose and graft polymerization reaction temperature.

Higher graft levels also are obtained with olefin polymers having a higher degree of crystallinity, at least about 30%, as measured by X-ray diffraction, being preferred. Such polymers are less subject to the rapid deactivation of the free radicals therein, the deactivation process being faster in the non-crystalline phase of the polymer than in the crystalline phase. The degree of crystallinity of the crystalline polypropylenes of commerce is about 60% and above.

The irradiated olefin polymer material should be maintained in contact with the monomer for at least about 3 minutes, preferably at least about 10 minutes in a semi-batch process and preferably about 30 to about 60 in a continuous process. For a given dose and monomer addition level, a longer contact time will result in a higher graft level up to a maximum contact time, which may differ for different doses, monomers, and monomer addition levels. Generally, contact times longer than about 3-4 hours are not required.

The contact time is better expressed in terms of the monomer feed rate. In the present process, the monomer feed rate can be as low as desired, and the minimum generally will be dictated by the capability of available equipment and economic considerations. While rates of at least about 0.1 pph/min can be used, the preferred rate is from about 1.5 to about 65 pph/min, most preferably from about 2.0 to about 60 pph/min.

After the olefin polymer material has been treated with the monomer, the resulting graft copolymer, while still maintained in a substantially non-oxidizing environment, is treated, preferably by heating, so as to deactivate substantially completely all of the residual free radicals therein. This substantially completely eliminates the possibility of the formation of peroxy radicals in the graft copolymer upon its exposure to air, which radicals can cause visbreaking or degradation of the polymer. In most instances, the deactivation temperature will be at least about 110° C., preferably at least about 120° C. While temperatures as high as about 250° C. can be used, it is preferred to select a deactivation temperature which is below the melting point of the graft copolymer, generally a maximum of about 150° C. for graft copolymers of polypropylene and a maximum of about 100° C. for graft copolymers of polybutene. Hence, the preferred deactivation temperature is from about 120° to 150° C. for graft copolymers of polypropylene, and about from 85° to 100° C. for graft copolymers of polybutene. Heating at the deactivation temperature for at least about 20 minutes generally is satisfactory. Free-radical deactivation can be accomplished also by the use of an additive, e.g., methyl mercaptan, that functions as a free radical trap.

Any unreacted vinyl monomer is removed from the graft copolymer either before or after radical deactivation or at the same time as deactivation. If the removal is effected before or during deactivation, a substantially non-oxidizing environment is maintained. In one preferred embodiment, the monomer is stripped from the graft copolymer in a nitrogen or other inert gas purge at the selected deactivation temperature, e.g., about 140° C. for polypropylene graft copolymers. In a continuous process, the graft copolymer may be transferred to a fluid bed and deactivated by heating at the selected temperature while the exit gas is condensed to remove the monomer carried out in the nitrogen purge.

The grafted olefin polymer material of the present invention is prepared by the free radical-initiated graft polymerization of at least one vinyl monomer at free radical sites on an as-polymerized or virgin olefin polymer material in particulate form having a weight average diameter of about 0.4–7 mm, a surface area of at least 0.1 $m^2/g$, and a pore volume fraction of at least about 0.07, i.e., seven percent (7%) of the volume is pores, and wherein more than 40% of the pores in the particle have a diameter greater than 1 micron. Preferably more than 50% of the pores in the particle have a diameter greater than 1 micron, and most preferably more than 90% of the pores in the particle have a diameter greater than 1 micron. The pore volume fraction is preferably at least 0.12, most preferably at least 0.20. Both the pore volume of at least about 0.07 and the pore diameter wherein more than 40% of the pores in the particle have a diameter in excess of 1 micron are critical to the preparation of the grafted olefin polymer material of this invention. Such as-polymerized or virgin olefin polymer materials having the combination of pore volume and pore diameter have not been available commercially until recently. In such olefin polymer material grafting and polymerization of the vinyl monomer takes place throughout the interior of particulate material as well as on the external surface thereof, resulting in a substantially uniform distribution of the graft polymer throughout the olefin polymer particle. Aside from these materials, the commercially available ethylene and propylene polymers in particulate form, even those having a reasonably high surface area, and high porosity, do not provide graft copolymers with internal graft polymerization or uniform distribution of the graft copolymer since they lack the combination of the requisite pore diameter and large pore volume fraction essential for producing the grafted olefin polymer product of this invention.

The microstructural differences between a grafted propylene homopolymer material of this invention and a grafted propylene homopolymer material made by graft polymerizing onto a conventional small-pore-diameter, low-porosity propylene homopolymer particle can be seen by reference to the drawing. In FIG. 1, which shows a grafted propylene homopolymer particle of the invention, i.e., a particle of the product of Example 8, regions of high polystyrene concentration, i.e., polystyrene grafted to the propylene homopolymer, are seen not only at the surface of the particle but throughout and deep within the interior of the particle. The presence of the polystyrene in these regions was confirmed by means of a Fourier Transform IR scanning microscope. In a particle of the product of Example 38 prepared from a typical commercially available particulate propylene homopolymer material shown in FIG. 2, the high polystyrene level is essentially confined to regions around the outer surface of the particle. The styrene content in the interior of this particle, if any, is extremely low, indicating an essentially ungrafted propylene homopolymer core. This was confirmed by IR scanning microscopy, i.e. the scanning microscope did not show any polystyrene content in the interior of this particle.

In addition to irradiation, the free radical or active sites may be produced in the particulate olefin polymer material by treating it with an organic compound which is a free-radical-generating polymerization initiator and has a decomposition half-life at the temperature employed of about from 1 to 240, preferably about from 5 to 100, and most preferably about from 10 to 40, minutes. Organic peroxides, and especially those which generate alkoxy radicals, constitute the preferred class of initiators. Azo compounds, such as azobisisobutyronitrile, may also be used. Inorganic peroxides are within the broadest ambit of this invention although not preferred. Two or more initiators having the same or different half-lives may be employed.

The method of this invention can be used to make grafted olefin polymers from any particulate olefin polymer material having a pore volume fraction as low as about 0.04. However, it is preferred that the graft polymerization be effected on olefin polymers having a pore volume fraction of at least 0.07 wherein more than 40% of the pores having a diameter larger than 1 micron. Most preferably, the olefin polymer used in the present method will have a pore volume fraction of at least about 0.20 with more than 90% of the pores having a diameter larger than 1 micron, a surface area of at least 0.1 m$^2$/g, and a weight average diameter in the range of about from 0.4 to 7 mm.

The following examples are illustrative of the grafted olefin polymer of this invention, and the foregoing process for making it.

Wherever molded polymer or copolymer is referred to in the examples, it was made by injection molding the particulate product in two stages under the following conditions: nozzle temperature 232° C., barrel at about 230° C., first-stage injection time 10 seconds, second-stage injection time 10 seconds, mold inlet water temperature 66° C., cooling time 20–30 seconds, mold open time 2 seconds.

The pore volume fraction values given herein were determined by a mercury porosimetry technique in which the volume of mercury absorbed by the particles is measured. The volume of mercury absorbed corresponds to the volume of the pores.

The surface area measurements were made by the method.

EXAMPLE 1

This example illustrates the grafted olefin polymer of this invention and a method of making same.
(a) Irradiation of the Polymer A finely divided porous propylene homopolymer (LBD-520A commercially available from HIMONT Italia S.p.A.) having the following characteristics: nominal melt flow rate (ASTM Method D 1238–82, Condition L) 22.7 dg/min; intrinsic viscosity (method of J. H. Elliott et al., J. Applied Polymer Sci. 14, 2947–2963 (1970)—polymer dissolved in decahydronaphthalene at 135° C.) 1.89 dl/g; extractability in methylene chloride 2.0 wt %; surface area (B.E.T.) 0.38 m$^2$/g; weight average diameter of 1.88 mm; and pore volume fraction (mercury porosimetry method) 0.45. More than 90% of the pores in the porous particles were larger than 1 micron in diameter.

The polypropylene (270 grams), substantially free of active oxygen, was placed on a moving conveyor belt to form a powder bed, approximately 2 cm thick, which was passed by the conveyor belt through an electron beam generated by a 2 MeV Van de Graaff generator operating at a 312 microamp beam current. The conveyor belt speed was adjusted to provide an absorbed surface dose of 4 Mrad, delivered at a dose rate of about 30 Mrad/min. The environment or atmosphere within the enclosed radiation chamber consisted essentially of nitrogen gas, the active oxygen content being maintained at less than 0.004% by volume. The chamber was at ambient temperature (about 23° C.).

(b) Treatment with Grafting Monomer

The irradiated polypropylene was conveyed from the radiation chamber into a graft polymerization reactor at ambient temperature (23° C.) where it was agitated and sprayed with 30 grams of liquid styrene monomer (10% styrene based on the total weight of styrene and polypropylene), added to the agitated powder at a rate of about 60 ml/min. A nitrogen environment or atmosphere was maintained in the graft polymerization reactor and in the transfer system for conveying the irradiated particles from the radiation chamber to the graft polymerization reactor so that the active oxygen content was less than 0.004% by volume. The time elapsing between the exposure of the polypropylene to the electron beam and its treatment with the styrene monomer was about two minutes.

The polymer powder upon treatment with the monomer, rose approximately 20° C. owing to the reaction exotherm. Agitation of the styrene-polypropylene mixture was continued for 30 minutes.

(c) Deactivation of Residual Free Radicals

After completion of the graft polymerization reaction, the reactor contents were heated to 140° C. by purging the reactor with heated nitrogen (supplemented by an electric heating mantle), and held at 140° C. for 30 minutes. The nitrogen flow rate was high enough to provide sufficient heat transfer to minimize heat-up time as well as sufficient mass transfer to remove any unreacted styrene monomer present. The free-flowing solid product remaining in the reactor weighed approximately 295 grams. Infrared analysis of this product indicated its polystyrene content to be 8.4 wt %. Its content in unreacted styrene monomer was less than 25 ppm. Infrared analysis of the insoluble portion of the product which remained after Soxhlet extraction with methylene chloride at 65° C. for 2 hours indicated that the polystyrene content of the polystyrene-grafted polypropylene was 8.8 wt %. The product's solubility in methylene chloride was 2.1 wt %, the soluble portion from the extraction containing low molecular weight polypropylene, low molecular weight polypropylene grafted with polystyrene, and styrene homopolymer. The total polystyrene content of the methylene chloride soluble fraction was 11.3 wt %, of which only a small portion was indicated to be styrene homopolymer by mass balance.

The melt flow rate (MFR) of the as-polymerized graft copolymer was 324 dg/min. The MFR of the graft copolymer and the above-given MFR of the starting as-polymerized polypropylene were measured on molded polymer. The procedure used to measure the MFR on these polymers, as well as on the products described in all of the examples which follow, was ASTM D1238, condition L.

The results of tests performed on the graft copolymer to determine its stiffness properties are given in Table I, along with the results of tests performed on (a) a physical blend of polypropylene and polystyrene having the same polystyrene content as the graft copolymer and (b) the polypropylene used to make both the graft copolymer and the blend.

In this example, as well as in all of the other examples which follow, flexural modulus and flexural strength were measured according to ASTM D-790.

TABLE I

|  | PP-PS Graft* Copolymer *8.4% PS) | PP-PS Blend** (8.4% PS) | PP |
|---|---|---|---|
| Flexural Modulus 1% secant, MPa | 1841 | 1579 | 1393 |
| Flexural Strength, MPa | 57 | 52 | 47 |

*PP = polypropylene and PS = polystyrene.
**MFR 146 dg/min, on molded polymer

Product Stability

A 10% polystyrene-grafted polypropylene made as described above, except for a styrene addition rate of 50 ml/min and a 60-minute agitation time in Step (b), had a MFR, measured on the particles, of 38 dg/min as-produced, 37.5 dg/min after 1 week, and 42.3 dg/min after 1 month. In contrast, a 9.6% graft copolymer made as described above, except that the styrene addition rate in Step (b) was 44 ml/min and Step (c), the deactivation step, was omitted (the reactor was purged with room temperature nitrogen and held at that temperature for 60 minutes to remove any unreacted styrene), had a MFR of 119 dg/min as-produced, 620 dg/min after 1 week, and 871 dg/min after 1 month, indicating on-going polymer degradation from the time of formation.

Also, the difference between the MFR of the grafted polypropylene and that of the starting polypropylene was significantly less in the case of the graft copolymer produced by the present method than in the case of the graft copolymer made by the method wherein residual free radicals were not deactivated.

Examples 2–5

The procedure and ingredients of Example 1 were used except that the amount of styrene was varied as shown in Table II, the amount of polypropylene and styrene, respectively, used was 240 grams and 60 grams in Example 2, 180 grams and 120 grams in Example 3, 150 grams and 150 grams in Example 4, and 120 grams and 280 grams in Example 5, and the styrene addition rate in Step (b) generally ranged from 40 to 60 ml/min.

The results of analytical measurements and property testing performed on each of the four resulting polystyrene graft copolymers of polypropylene are given in Table II, along with the results obtained with physical blends of polypropylene (the same polypropylene as used to make the graft copolymers) and polystyrene having essentially the same polystyrene contents as the graft copolymers. The tensile strengths and yield elongations shown in Table II, as well as in all of the other examples which follow, were determined according to ASTM D-638.

Examples 6 and 7

The procedure and ingredients of Example 4 were used except that the dose in Step (a) was 1 Mrad in Example 6 and 12 Mrad in Example 7, the monomer addition rate in Step (b) was 55–65 ml/min, and 200 grams each of polypropylene and styrene was used. In Example 6 the dose rate in Step (a) was 7.5 Mrad/min. The results of analytical measurements and property testing performed on the two resulting polystyrene graft copolymers of polypropylene are given in Table II.

TABLE II

|  | Ex. 2 | Ex. 3 | Ex. 4 | Ex. 5 | Ex. 6 | Ex. 7 | PP-PS Blend** | PP-PS Blend** | PP-PS Blend** | 100% Polypropylene* |
|---|---|---|---|---|---|---|---|---|---|---|
| Styrene Addn. Level (Wt %) | 20 | 40 | 50 | 70 | 50 | 50 |  |  |  |  |
| Polystyrene (wt %) added to form blend |  |  |  |  |  |  | 16.6 | 37.3 | 47.0 |  |
| Polystyrene (wt %) IR on as-grafted solid | 16.6 | 34.6 | 37.3 | 47.0 | 30.5 | 40.1 |  |  |  |  |
| Polystyrene (wt %) IR on CH$_2$Cl$_2$-insol. | 17.8 | 34.2 | 38.6 | 44.3 | 31.2 | 40.1 |  |  |  |  |
| Polystyrene (wt %) IR on CH$_2$Cl$_2$-sol. | 18.7 | 25.2 | 38.7 | 47.9 | 25.1 | 41.3 |  |  |  |  |
| Wt % solable in CH$_2$Cl$_2$ | 2.1 | 2.1 | 2.2 | 2.2 | 2.1 | 2.0 |  |  |  |  |
| MFR (dg/min) | 30 | 2.6 | 2.3 | 0.6 | 4.4 | 20.6 | 24 | 27 | 21 |  |
| Tensile Strength (MPa) |  | 35.9 | 32.7 | 35.5 | 39.0 | 26.9 | 32.1 | 28.9 | 31.5 | 32.0 |
| Yield Elongation (%) | 3.4 | 2.1 | 2.2 | 3.6 | 1.6 | 5.5 | 3.2 | 2.5 | 11.9 |  |
| Flexural Modulus 1% secant (MPa) | 1979 | 2165 | 2199 |  | 2144 |  | 1799 | 1896 | 2123 | 1393 |
| Flexural Strength (MPa) | 62.1 | 66.9 | 66.2 | 62.7 | 68.3 | 53.1 | 57.2 | 50.3 | 56.5 | 46.9 |

*The polypropylene used to make the graft copolymers and blends.
**PP = polypropylene and PS = polystyrene.

Examples 8–11

The procedure and ingredients of Example 1 were used except that 210 grams of polypropylene and 90 grams of styrene were used, the styrene (a liquid) was diluted with different amounts of methanol in Examples 9, 10, and 11 and the methanol-diluted styrene was sprayed onto the polymer at a rate of about 50 ml/min in Example 9, about 40 ml/min in Example 10, and about 57 ml/min in Example 11. The graft levels and melt flow rates obtained are shown in Table III. The product of Example 8 contained 26.4 wt % polystyrene by IR on the resultant graft copolymer solid, and 53 wt % polystyrene by IR on the $CH_2Cl_2$-soluble fraction.

TABLE III

| Example No. | Methanol grams | Polystyrene (wt %) IR on $CH_2Cl_2$-insol. | MFR* (dg/min) |
|---|---|---|---|
| 8 | 0 | 22.8 | 5.7 |
| 9 | 45 | 27.1 | 15.7 |
| 10 | 90 | 19.6 | 22.8 |
| 11 | 180 | 11.0 | 55.9 |

*Measured on particles

Control Experiment 1

The following experiment shows the advantage of irradiating the polymer material prior to its exposure to the vinyl monomer.

The same polypropylene as was used in Example 1 (31.5 g) was placed in a flask, and the flask sealed and purged with nitrogen for 30 minutes. Liquid styrene (13.5 g) was injected into the flask, and the polypropylene and styrene were mixed for 5 minutes. The mixture was irradiated with a 2 MeV electron beam to a dose of 4 Mrad (dose rate about 30 Mrad/min). The mixture was stirred for 30 minutes, quenched in a 140° C. oil bath for 30 minutes, and dried for 2 hours at 80° C. in a vacuum oven.

The polystyrene content of the resultant product was only 6.2 wt %, as determined by IR analysis. The $CH_2Cl_2$-insoluble fraction was 5.2 wt % grafted polystyrene. The $CH_2Cl_2$-soluble fraction contained 49 wt % polystyrene. The soluble fraction constituted 3.6% of the product by weight. A mass balance indicated that styrene homopolymer had formed. The MFR of the graft copolymer was 500 dg/min.

Control Experiments 2–4

The procedure and ingredients of Example 8 were used except that air was used instead of nitrogen as shown in Table IV and Step (c) was omitted in Control Experiment 3. The results are shown in Table IV.

TABLE IV

| Control Expt. No. | Air Present | Polystyrene (wt %) IR on $CH_2Cl_2$-insol. | MFR** (dg/min) |
|---|---|---|---|
| 2 | Step (a) | 25.1 | 123 |
| 3 | Step (b)* | 0 | >1000 |
| 4 | Step (c) | 27.0 | 471 |

*Step (c) omitted
**Measured on particles

Examples 12

The procedure and ingredients of Example 1 were used except that a polypropylene having a MFR of 6.9 dg/min, a pore volume fraction of 0.33, a surface area (B.E.T.) of 0.34 $m^2/g$ and more than 90% of the pores larger than 1 micron in diameter, was used (LBD 406A commercially available from HIMONT Italia S.p.A.), 200 grams each of polypropylene and styrene was used and the styrene addition rate was about 50 ml/min. The resulting solid graft copolymer product contained 41.2 wt. % polystyrene as determined by IR on the product and had a MFR of 1.2 dg/min as measured on a part molded from the product.

Examples 13–16

The procedure and ingredients of Example 1 were used except that Pro-fax 6801 polypropylene having an IV of 5.04 dl/g, a MFR of 0.3 dg/min, a surface area (B.E.T.) of 2.5 $m^2/g$, a pore volume fraction (by mercury porosimetry) of 0.15, a weight average diameter (Dw) of 0.21 mm, a bulk density of 0.53 g/ml, and a solubility in methylene chloride of 0.5 wt % was used. None of the pores in the particles were larger than 1 micron in diameter. The methods used to determine the properties of the polypropylene were the same as those to determine the properties of the polypropylene of Example 1.

The reaction time was 60 minutes in Example 13; the total polypropylene and styrene weight was 400 grams in Examples 14, 15, and 16; and the styrene addition rate was about 50 ml/min in Example 13 and about 40–60 ml/min in Examples 14, 15, and 16.

The analytical results for each of the four resulting polystyrene graft copolymers of polypropylene are shown in Table V. Morphology studies show that the graft copolymer was concentrated along the outer surface of the particles so as to form a shell of graft copolymer around the polypropylene particle core.

TABLE V

|  | Ex. 13 | Ex. 14 | Ex. 15 | Ex. 16 |
|---|---|---|---|---|
| Styrene Addn. Level (wt %) | 10 | 30 | 50 | 70 |
| Polystyrene (wt %) IR on solid as-grafted | 8.1 | 23.9 | 49.3 | 48.1 |
| Polystyrene (wt %) IR on $CH_2Cl_2$-insol. | 8.0 | 24.2 | 49.3 | 49.3 |
| Polystyrene (wt %) IR on $CH_2Cl_3$-sol. | 60 | 72 | 79 | 90 |
| Wt % soluble in $CH_2Cl_2$ | 0.1 | 0.4 | 0.5 | 0.5 |
| *MFR (dg/min) | 0.33 | 0.27 | 0.10 | 0.02 |

*Measured on molded part

Examples 17–20

The procedure and ingredients of Example 1 were used except that n-butyl methacrylate (BMA) was substituted for styrene, and the amounts of polypropylene and BMA used, respectively, were 270 grams and 30 grams in Example 17, 210 grams and 90 grams in Example 18, 150 grams and 150 grams in Example 19, and 90 grams and 210 grams in Example 20. The test results are given in Table VI.

TABLE VI

|  | Ex. 17 | Ex. 18 | Ex. 19 | Ex. 20 |
|---|---|---|---|---|
| BMA Addn. Level (wt %) | 10 | 30 | 50 | 70 |
| Poly(BMA) (wt %) IR on solid as-grafted | 8.2 | 26.8 | 46.9 | 68.3 |

TABLE VI-continued

|  | Ex. 17 | Ex. 18 | Ex. 19 | Ex. 20 |
|---|---|---|---|---|
| Poly(BMA) (Wt %) IR on $CH_2Cl_2$-insol. | 7.0 | 29.1 | — | 68.0 |
| (Poly)BMA (wt %) IR on $CH_2Cl_2$-sol. | 37.0 | 28.2 | 96 | 65.1 |
| Wt % soluble in $CH_2Cl_2$ | 2.0 | 2.3 | 1.8 | 2.0 |
| *MFR (dg/min) | 320 | 58 | 27 | 0.8 |
| Tensile Strength (MPa) | 29.6 | 22.2 | 15.6 | 11.7 |
| Yield Elongation (%) | 9.7 | 16.3 | 25.1 | 25.2 |
| Elongation Break, mm (ASTM D-638) | quick break | 72 | 292 | 242 |
| Flexural Modulus 1% secant (MPa) | 1310 | 910 | 600 | 434 |
| Flexural Strength (MPa) | 42.7 | 29.6 | 19.3 | 13.1 |

*Measured on molded part.

Examples 21–24

The procedure and ingredients of Examples 13–16 were used except that n-butyl methacrylate (BMA) was used instead of styrene and was added at a rate of about 40–60 ml/min.

The test results for each of the four resulting poly(n-butyl methacrylate) graft copolymers of polypropylene are shown in Table VII. Morphology studies show that the grafted polymer formation was concentrated along the outer surface of the particles so as to form a shell of graft copolymer around the polypropylene particle core.

TABLE VII

|  | Ex. 21 | Ex. 22 | Ex. 23 | Ex. 24 |
|---|---|---|---|---|
| BMA Addn. Level wt % | 10 | 3 | 50 | 70 |
| Poly(BMA) (wt %) IR on solid as-grafted | 7.9 | 27.8 | 46.6 | 63.5 |
| Poly(BMA) (wt %) IR on $CH_2Cl_2$-insol. | 9.9 | 28.8 | 47.7 | 68.0 |
| (Poly)BMA (wt %) IR on $CH_2Cl_2$-sol. | 100 | 80 | 76 | 79.5 |
| Wt % sol. in $CH_2Cl_2$ | 0.3 | 0.6 | 0.7 | 0.9 |
| *MFR (dg/min) |  | 10.3 | 5.1 |  |

*Measured on molded part

Examples 25–27

The procedure and ingredients of Example 1 were used except that n-butyl acrylate was substituted for styrene; the amounts of polypropylene and n-butyl acrylate used, respectively, were 360 grams and 40 grams in Example 25, 312 grams and 88 grams in Example 26, and 200 grams and 200 grams in Example 27; and the polypropylene (LBD-406A commercially available from HIMONT Italia S.p.A.) had a nominal MFR of 6.9 dg/min, an intrinsic viscosity of 2.4 dl/g, a solubility in methylene chloride of 1.4 wt %, a surface area of 0.34 $m^2/g$ (B.E.T.), a pore volume fraction (by mercury porosimetry) of 0.33 and over 90% of the pores had a diameter greater that 1 micron. The results of tests and measurements performed on the resulting n-butyl acrylate graft copolymers of polypropylene are given in Table VIII.

TABLE VIII

|  | Ex. 25 | Ex. 26 | Ex. 27 |
|---|---|---|---|
| Bu Acrylate Addn. Level (wt %) Graft Copolymer | 10 | 22 | 50 |
| Poly (Bu Acrylate) (wt %) by Mass Balance on Solid As-Grafted | 8.8 | 21.2 | 48.1 |
| *MFR (dg/min) | 60.5 | 11.0 | 6.8 |
| Flexural Modulus 1% secant (MPa) | 1400 | 1027 | 503 |
| Flexural Strength (MPa) | 46.2 | 37.9 | 14.5 |
| Tensile Strength (MPa) | 31.0 | 24.1 | 11.0 |
| Yield Elongation (%) | 9.9 | 12.9 | 19.0 |
| Notched Izod Impact at 23° C. (J/m) (ASTM D-256) | 69.4 | 294 | no break |

*Measured on molded part

Examples 28–30

Different monomers were grafted onto polypropylene using the procedure and ingredients of Example 1, except as follows:

Example 28: Pro-Fax 6501 polypropylene (360 grams), having a MFR of 2.6 dg/min was used. The monomer, benzyl methacrylate (40 grams), was added to the polypropylene at a rate of about 10 ml/min, and agitation was continued for 60 minutes. Thereafter the particles were removed from the graft polymerization reactor and kept in a room temperature vacuum oven for 15 minutes to remove any entrained air. The temperature was raised to 140° C. and held there for 60 minutes. The product weighed approximately 384 grams. The Soxhlet extraction was carried out with methyl ethyl ketone (MEK) at 75° C.

Examples 29 and 30: The procedure was modified as in Example 28 except that the monomer was phenylethyl methacrylate and the rate of addition 12 ml/min in Example 29, and the monomer was phenoxyethyl methacrylate and the rate of addition 6 ml/min in Example 30.

The graft levels achieved in these examples, as determined by infrared analysis of the MEK-insoluble fraction of the product, and the melt flow rates of the graft copolymers, are shown in Table IX.

TABLE IX

| Example No. | Monomer | Grafted Polymerized Monomer (wt %) by IR on MEK-insol. | MFR (dg/min) |
|---|---|---|---|
| 28 | Benzyl methacrylate | 7 | 40 |
| 29 | Phenylethyl methacrylate | 7 | 52 |
| 30 | Phenoxyethyl methacrylate | 6 | 18 |

Examples 31–32

These examples illustrate the preparation of a copolymer of styrene and maleic anhydride grafted onto polypropylene.

The procedure and ingredients of Example 1 was used except that the MFR of the polypropylene was 44.7 dg/min and its intrinsic viscosity was 1.51 dl/g; a liquid mixture of 60 grams of styrene, 60 grams of maleic anhydride, and 78 grams of acetone was sprayed onto 280 grams of the irradiated polypropylene in Example 31 and a liquid mixture of 100 grams of styrene, 100 grams of maleic anhydride, and 78 grams of acetone was added to 200 grams of the polypropylene (methanol and toluene/acetone mixtures are alternative solvents for the maleic anhydride) in Example 32. The results are given in

TABLE X

|  | Ex. 31 | Ex. 32 |
| --- | --- | --- |
| Monomer Addn. Level (Styrene + Maleic Anhyride) (wt %) Graft Terpolymer | 30 | 50 |
| Styrene Component (wt %) IR on solid as-grafted | 14.5 | 22.3 |
| Maleic Anhydride Component (wt %) IR on solid as-grafted | 14.5 | 23.8 |
| *MFR (dg/min) | 5.0 | 0.4 |
| HDT @455 kPa (°C.)** | 114 | 131 |
| HDT @1820 kPa (°C.)** | 58 | 67 |
| Flexural Modulus 1% secant (MPa) | 1586 | 2110 |

Examples 34–37

The procedure and ingredients of Example 1 were used except that an ethylene/propylene random copolymer having an ethylene content of about 4.0% (Examples 34 and 35), and a chemically blended EPR-modified polypropylene having a polypropylene content of about 88% and an EPR content of about 12%, with an ethylene content of about 8% (Examples 36 and 37) were substituted for the propylene homopolymer, and in Examples 35 and 37 n-butyl methacrylate was substituted for the styrene. The polymer and the monomer each were used in the amounts of 200 grams (50 wt % monomer), the monomer having been added at the rate of about 45 ml/min. The radiation dose was 1 Mrad, and the dose rate about 7.5 Mrad/min.

The test results for each of the four resulting graft copolymers are given in Table XI, along with the results obtained with physical blends of the same starting propylene polymers with the same amount of polystyrene or poly(n-butyl methacrylate) as contained in the graft copolymers.

TABLE XI

|  | Ex. 34 | Ex. 35 | Ex. 36 | Ex. 37 | **PP-PS Blend | **PP-Poly-(BMA) Blend | ***PP-PS Blend | ***PP-Poly(BMA) Blend |
| --- | --- | --- | --- | --- | --- | --- | --- | --- |
| Polystyrene or Poly (BMA)* (wt %) IR on sold as-grafted | 23.2 | 28.5 | 23.9 | 34.3 |  |  |  |  |
| IR on CH₂Cl-insol. | 21.0 | 24.9 | 26.0 | 26.7 |  |  |  |  |
| IR on CH₂Cl₂-sol. | 31.4 | 12.4 | 40.1 | 34.9 |  |  |  |  |
| Wt % sol. in CH₂Cl₂ | 1.6 | 1.7 | 1.4 | 1.5 |  |  |  |  |
| Polystyrene or Poly (BMA) (wt %) added to form blend |  |  |  |  | 23.2 | 28.5 | 23.9 | 34.3 |
|  | 5.2 | 9.1 | 0.68 | 12.7 | 16.6 | 62 | 7.6 | 37 |
| Flexural Modulus 1% secant (MPa) | 1613 | 820 | 1772 | 869 | 1455 | 689 | 1606 | 558 |
| Flexural Strength (MPa) | 53.1 | 26.9 | 54.5 | 26.9 | 48.3 | 24.8 | 51.0 | 18.6 |
| Notched Izod Impact at 23° C. (J/m) (ASTM D-256) | 26.7 | 16.0 | 90.8 | 64.1 | 26.7 | 16.0 | 42.7 | 245.5 |

*Polystyrene in Examples 34 and 36. Poly (BMA) in Examples 35 and 37.
**PP = Propylene polymer of Examples 34 and 35; PS = Polystyrene
***PP = Propylene polymer of Examples 36 and 37.

TABLE X-continued

|  | Ex. 31 | Ex. 32 |
| --- | --- | --- |
| Flexural Strength (MPa) | 47.6 | 53.1 |
| Tensile Strength (MPa) | 22.7 | 19.1 |

*Measured on molded part
**ASTM D-648

Example 33

The procedure and ingredients of Example 1 was used except that a liquid mixture of 60 grams of styrene and 60 grams of alpha-methylstyrene was sprayed onto 280 grams of the irradiated polypropylene at a rate of about 48 ml/min and the polypropylene had a MFR of 45 dg/min and a bulk density of 0.36 g/ml. The graft level (total styrene plus alpha-methylstyrene) was about 21 wt. %. The styrene/alpha-methylstyrene ratio in the graft copolymer was about 1/1.

Example 38

The procedure described in Example 15 was repeated with the exception that the Pro-Fax 6801 polypropylene had an IV of 4.89 dl/g, a MFR of 0.2 dg/min, a surface area of 0.14 m²/g, a pore volume fraction (by mercury porosimetry) of 0.04, a weight average diameter of 0.36 mm, a bulk density of 0.55 g/ml, and a solubility in methylene chloride of 0.4 wt %. There were no pores which were larger than 1 micron in diameter. The amounts of polypropylene and styrene used were 150 grams each. The wt. % polystyrene in the resulting graft copolymer was 23.2 by IR on the solid as-grafted, and 26.0 by IR on the CH₂Cl₂-insoluble fraction.

Morphology studies showed that graft polymer formation was concentrated along the outer edges of the particles so as to form a shell of graft polymer around the polypropylene particle core (FIG. 2).

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A method of making a graft copolymer of an olefin polymer comprising the steps of:
   (a) irradiating a particulate olefin polymer material at a temperature in the range of about from 10° to 85° C. with high-energy ionizing radiation to produce free radical sites without causing gelation of the particulate olefin polymer material;
   (b) treating the irradiated particulate olefin polymer material at a temperature up to about 100° C. for a period of at least about 3 minutes, with about from 5 to 80 percent by weight, based on the total weight of olefin polymer and vinyl monomer used, of at least one vinyl monomer capable of being polymerized by free radicals;
   (c) simultaneously or successively in optional order,
      (1) heating the resultant grafted particulate olefin polymer material to a temperature of at least 110° C., thereby deactivating substantially completely all residual free radicals therein, and
      (2) removing any unreacted vinyl monomer from said material;
   the particulate olefin polymer material being maintained in a substantially non-oxidizing environment throughout steps (a) to (c) at least until after the deactivation of residual free radicals has been completed.

2. The method of claim 1 wherein the particulate material of (b) is agitated and treated with monomer at a rate which is low enough to keep the material free-flowing.

3. The method of claim 2 wherein the treatment with monomer is by releasing a mist of liquid droplets onto the agitated particles.

4. The method of claim 1 wherein said irradiated particulate material is treated with vinyl monomer at a temperature in the range of about from 10° to 50° C.

5. The method of claim 1 wherein (b) is performed within at least two hours after the completion of (a).

6. The method of claim 1 wherein the particulate material of (a) has a pore volume fraction of at least about 0.04.

7. The method of claim 1 wherein said vinyl monomer is selected from the group consisting of vinyl-substituted aromatic, heterocyclic, and alicyclic compounds, unsaturated aliphatic carboxylic acids and derivatives thereof, unsaturated aliphatic nitriles, vinyl esters of aromatic and saturated aliphatic carboxylic acids, divinyl compounds and mixtures therof.

8. The method of claim 7 wherein said vinyl monomer is selected from the group consisting of styrene, alkyl-substituted styrenes, esters of acrylic and methacrylic acids, vinyl acetate, and mixtures therof.

9. The method of claim 8 wherein the monomer is styrene.

10. The method of claim 1 wherein the residual free radicals are deactivated by heating the grafted olefin polymer particles at a temperature of about 110° C. to about 150° C.

11. The method of claim 1 wherein said olefin polymer material is a homopolymer of propylene or 1-butene.

* * * * *

UNITED STATES PATENT AND TRADEMARK OFFICE
CERTIFICATE OF CORRECTION

PATENT NO. : 5,652,281

DATED : July 29, 1997

INVENTOR(S) : Paolo Galli et al

It is certified that error appears in the above-identified patent and that said Letters Patent is hereby corrected as shown below:

At col. 11, line 56, before "method" insert --B.E.T.--.

At col. 17, line 39, in Table VII, under Ex. 22, change "3" to --30--.

Signed and Sealed this

Twenty-first Day of July, 1998

Attest:

BRUCE LEHMAN

Attesting Officer

Commissioner of Patents and Trademarks